United States Patent [19]

Muehlenbrock et al.

[11] 4,200,734
[45] Apr. 29, 1980

[54] PROCESS FOR POLYMERIZATION OF POLYVINYL CHLORIDE AND VCM MONOMER REMOVAL

[75] Inventors: Dale R. Muehlenbrock, Pasadena; John R. Prihoda, Houston; Leonard Singleton, Jr., Baytown, all of Tex.

[73] Assignee: Diamond Shamrock Corporation, Dallas, Tex.

[21] Appl. No.: 853,527

[22] Filed: Nov. 21, 1977

[51] Int. Cl.$^2$ .................. C08F 6/00; C08F 6/10; C08F 6/24

[52] U.S. Cl. .................. 528/503; 165/164; 526/344; 526/344.2; 528/500; 528/502

[58] Field of Search .......... 528/500, 503; 526/344; 165/164

[56] References Cited

U.S. PATENT DOCUMENTS

| 3,926,927 | 12/1975 | Stookey | 159/48 R |
|---|---|---|---|
| 4,032,497 | 6/1977 | Kidoh | 260/29.6 R |

FOREIGN PATENT DOCUMENTS

| 2521780 | 11/1976 | Fed. Rep. of Germany | 528/499 |
|---|---|---|---|
| 2621987 | 12/1976 | Fed. Rep. of Germany | 528/500 |
| 2638492 | 10/1977 | Fed. Rep. of Germany | 165/164 |

Primary Examiner—C. A. Henderson
Attorney, Agent, or Firm—Arthur S. Collins; John C. Tiernan

[57] ABSTRACT

The present invention relates to an improvement in a process for polymerization of polyvinyl chloride, particularly in a suspension polymerization process which provides for removal of residual vinyl chloride monomer, such as by employing a step in which the PVC suspension resin slurry is passed through a column in which it is subjected to a combination of stream and pressure/vacuum conditions. In the improved process of the present invention, the PVC suspension resin slurry feed to the stripping column is first passed through the cold feed side of a spiral hat exchanger, and the PVC suspension slurry outflow from the stripping column is passed through the hot feed side of the heat exchanger, whereby the feed stream to the stripping column acts as a cooling medium for the outlet stream from the stripping column, and the outlet stream from the stripping column serves as a preheating medium for the feed stream.

3 Claims, 5 Drawing Figures

PROCESS FOR POLYMERIZATION OF POLYVINYL CHLORIDE AND VCM MONOMER REMOVAL

BACKGROUND OF THE INVENTION

Present invention relates to the polymerization of polyvinyl chloride, more particularly to suspension polymerization of polyvinyl chloride (PVC), and still more particularly to post polymerization treatment of the PVC suspension resin slurry which provides for more efficient removal of residual vinyl chloride monomer.

Homopolymers and copolymers of polyvinyl chloride have long been one of the largest and most versatile thermoplastic polymers, the vast majority of which has traditionally been manufactured by suspension polymerization techniques. In suspension polymerization, an intimate mixture of at least one polymerizable monomer and at least one suspending agent are suspended in aqueous medium and subjected to suitable polymerization conditions of time, temperature, and pressure. While there are countless literature and patent teachings of such processes, U.S. Pat. Nos. 2,833,754, 3,026,308, and 3,054,786 may be mentioned as three typical examples of such teachings.

In such techniques, the water and suspending agent(s) are first charged to the reactor, then the vinyl chloride monomer (and any comonomers) and the catalyst(s) are charged to the reactor, and the reaction is then permitted to continue until the desired degree of polymerization is achieved, usually as evidenced by a pressure drop in the reactor. At this point, the liquid medium is transferred to a blowdown tank or other suitable raw slurry storage tank (hereinafter "blowdown tank" for convenience), any gaseous vinyl chloride is collected, and the liquid phase is then subjected to a series of drying steps in which water is removed and the polymer is ultimately dried.

The most significant inherent undesirable property of polyvinyl chloride polymers is their susceptibility to degradation on exposure to heat and/or light. It is, of course, well known that such degradation, particularly heat degradation, is a function not only of the time and temperature of the immediate heat environment to which the PVC is subjected, but also a function of the "heat history" of the polymer, that is to say the cumulative effect of all the heat environments to which it has heretofore been subjected. Thus, where a particular mass of polyvinyl chloride polymer is subjected to even a brief period at moderately high temperature (e.g., in excess of about 200° F.) though it may not evidence any discernable evidence of degradation, it will indeed have suffered adverse heat stability effects. If such a mass is subsequently subjected to additional heat conditions (e.g., during extrusion or other end use forming procedures), the cumulative heat history of the particular resin mass, as well as the immediate heat conditions to which it is then subjected, wil determine whether or not objectionable degradation will occur.

Certain essential process steps, of course, must be carried out in spite of this potential deleterious effect on the heat history of the polymer mass being treated. For example, the polymer must be dried, and all free water must be removed. While the last traces of water will indeed be removed by heat, the major portion of the water removal will be achieved by mechanical means, usually centrifugal or other mechanical filtration procedures.

With the increasing awareness of the potential dangers of vinyl chloride monomer (VCM), and the recognition that potentially significant concentrations of residual VCM can be entrapped in the polymer particle, new procedures have been introduced to promote recovery of unreacted VCM, and reduction of the residual VCM in the finished polymer particle. A wide variety of specific procedures have been suggested, and in many cases are in commercial use, to achieve these results.

In one such procedure, the PVC suspension resin slurry is stripped of residual vinyl chloride monomer in a colum using a combination of steam and pressure/vacuum control. The slurry from the blowdown tank is fed to top of the column, and flows downward over a series of trays to the bottom, while stream is added near the botom of the column and flows upward through the slurry, stripping it of VCM. The VCM-water vapor stream passes through the top of the column, the water is removed by condensation, and the recovered monomer is returned to the process. The stripped PVC slurry is fed from the bottom of the column to a cooling means and then to the drying and resin fin hing systems. See, for example, U.S. Ser. No. 592,119 filed July 1, 1975 and since abandoned in favor of C-I-P application Ser. No. 728,521, filed on Oct. 1, 1976.

Like drying of the resin, such a stripping procedure has an adverse effect on the heat history of the resin treated, but clearly it is now essential. In order to minimize the deleterious effect on heat history, the slurry being removed from the stripping column, which is usually at a temperature of from about 200° to 240° F., (about 93° to 116° C.) was fed to a cooling means where it was cooled as quickly as possible. One such cooling means is a conventional jacketed tank, using cool water to quickly lower the temperature of the slurry. On the other hand, one type of cooling means which has not heretofore been employed for such applications is a conventional heat exchanger, because of thhe tendency of the suspension resin particles to settle out, with the resultant blockage of the cooling means.

DRAWINGS

SUMMARY OF THE INVENTION

We have now found that a substantial energy saving can be achieved, and/or the VCM removal can be more effectively carried out, by employing a spiral heat exchanger, and using the slurry feed from the blowdown tank in place of water as the cooling medium. Thus, the feed stream from the blowdown tank to the stripping column acts as a cooling medium for the outlet stream from the stripping column, while the outlet stream from the stripping column acts as a preheating medium for the feed stream to the stripping column.

This, of course, results in a substantial savings in terms of heat energy (steam) input to the stripping column, and/or higher efficiency in removal of VCM. In some cases, this could possibly involve subjecting the polymer to a potentially longer period of exposure at high temperature, and/or a potentially slower cooling curve for the outlet feed from the stripper. Very surprisingly, however, it does not appear to have any substantial additional adverse effect on the heat history of the polymer being treated (over the above that imparted in normal treatment in the stripping column). Also, the heat exchanger operates surprisingly effectively in a slurry-to-slurry configuration, without any significant clogging.

Figure 1:
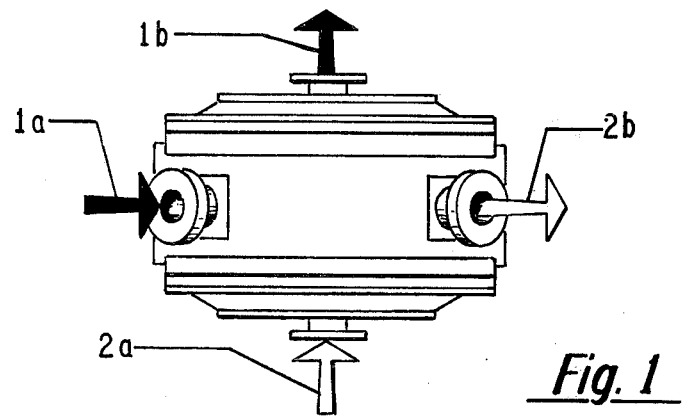
FIG. 1 is a plan view from the top of a horizontal spiral heat exchanger suitable for use in the process of the present invention.
Figure 2:
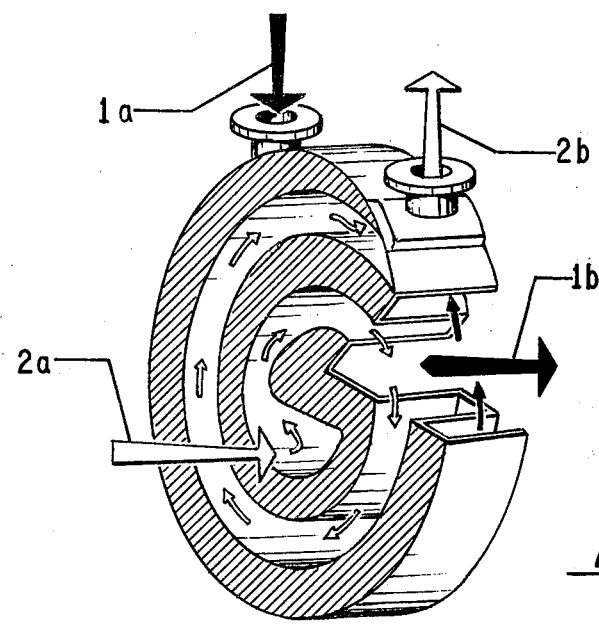
FIGS. 2 and 3 are sectional views of the heat exchanger of FIG. 1 illustrating the flow paths through the heat exchanger.
Figure 3:
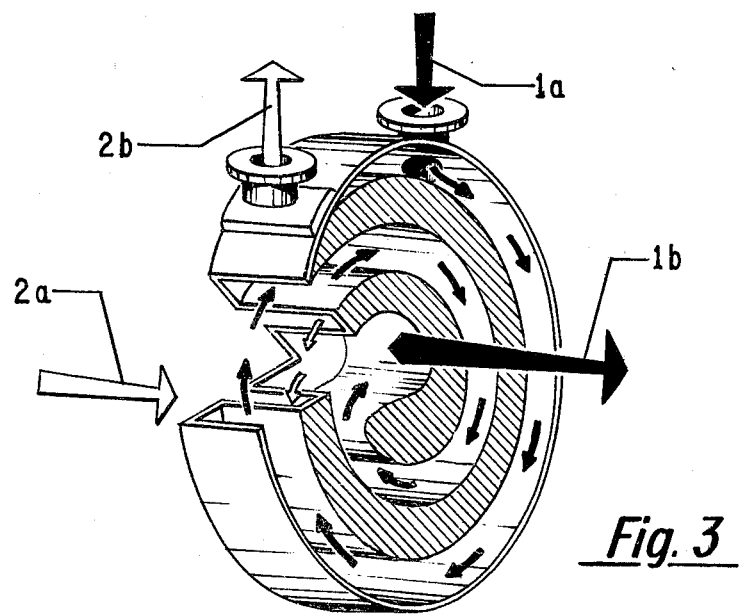

FIGS. 1, 2, and 3 illustrate a spiral heat exchanger suitable for use in conjunction with the process of the present invention. FIG. 1 is a top view showing inlet ports 1a and 2a, and outlet ports 1b and 2b. FIGS. 2 and 3 illustrate the flow from paths of the raw PVC resin slurry (from the blowdown tank) through the cold side of the heat exchanger, and of the stripped PVC resin slurry through the hot side of the heat exchanger.

Figure 4:
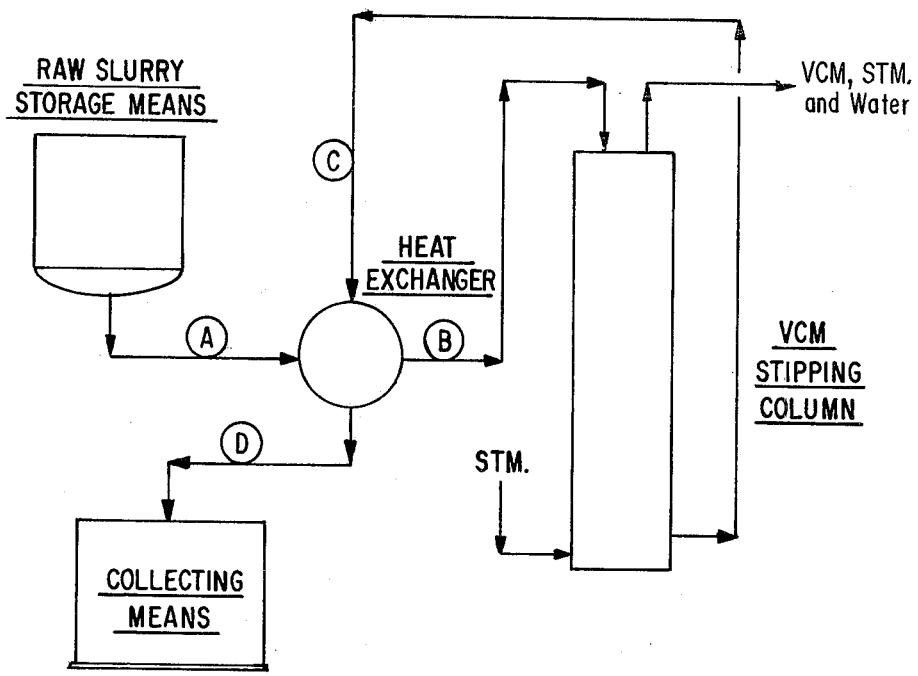
FIG. 4 is a flow diagram illustrating one embodiment of the present invention.

FIG. 4 depicts a flow diagram for one embodiment of the present invention. Raw PVC resin slurry from the blowdown tank is fed (Stream A) to a spiral heat exchanger; from said heat exchanger, it is fed (Stream B) to the top of a VCM stripping column. Stripped slurry is removed from the bottom of VCM stripping column and fed (Stream C) to said heat exchanger, and from there, fed (Stream D) to a collecting means from which it can then be dried and finished in the conventional manner.

In the process illustrated by FIG. 4, Stream A from the blowdown tank is at a temperature of from about 70° to about 115° F. (about 21° to about 46° C.) as it is fed to the heat exchanger, for example, to inlet port 1a of the heat exchanger illustrated in FIG. 1. Stream B is at a temperature of from about 150° to about 190° F. (about 66° to about 88° C.) as it leaves the heat exchanger, e.g., as it exits from outlet port 1b of the heat exchanger illustrated in FIG. 1.

Stream C is at a temperature of from about 180° to about 230° F. (about 82° to about 110° C.) as it exits from the stripping column to be fed to the heat exchanger, e.g., the inlet port 2a of the heat exchanger illustrated in FIG. 1. Stream D is at a temperature of from about 90° to about 140° F. (about 32° to about 60° C.) as it exits from the heat exchanger, e.g., from outlet port 2b of the heat exchanger illustrated in FIG. 1.

While average feed rates will vary according to the amount of slurry to be treated, the capacity of the heat exchanger, and the like, it is to be expected that the stripped slurry, Streams C and D, will be fed through the heat exchanger (or at least withdrawn from the stripping column) at a somewhat faster rate than the raw PVC resin slurry feed, Streams A and B, generally about 5 to about 20 percent faster. Thus, where, for example, raw slurry is fed to (and through) the heat exchanger the rate of about 107 gallons per minute (gpm), steam condensation will increase slurry volume during treatment in the stripping column, requiring that about 122 gpm be withdrawn from the stripping column. Employing the process of FIG. 4, to treat a 30 percent solids slurry of PVC suspension resin (Sp. G 1.1) at the above rates (107/122 gpm), it is possible to effect energy savings of $2.56 \times 10^{10}$ BTU/year.

PREFERRED EMBODIMENT

In the preferred embodiment of the present invention, only a portion of the stripped slurry exiting from the stripping column is fed to the heat exchanger, and the cooled slurry exiting from the heat exchanger is recycled to the bottom portion of the stripping column where it reduces the temperature of the slurry being withdrawn and allows the largest portion of this stream to be fed directly to the collecting tank without further cooling and with a substantially more desirable heat history.

Figure 5:
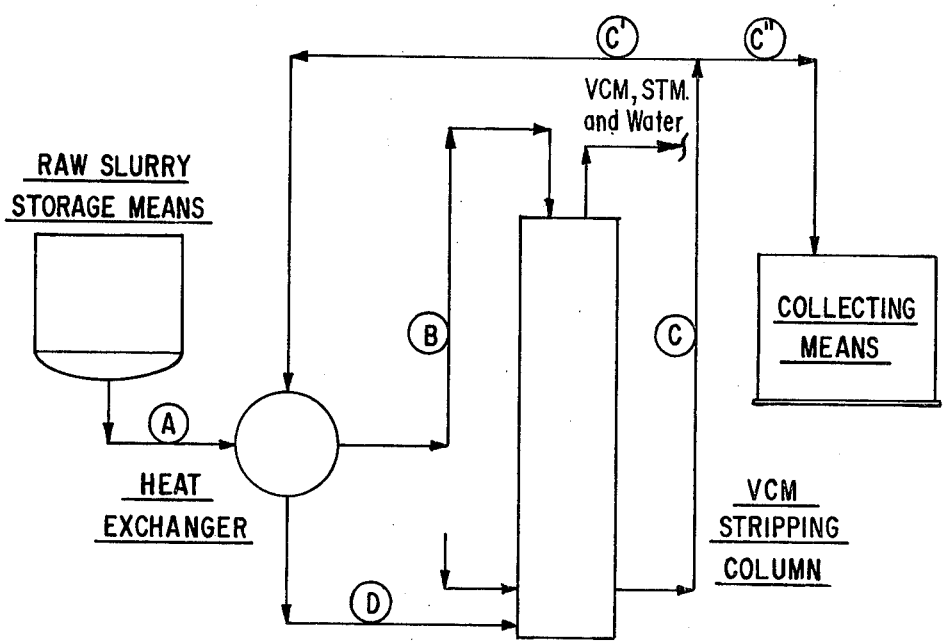
FIG. 5 is a flow diagram illustrating another embodiment of the present invention.

This preferred embodiment is illustrated by the flow diagram of FIG. 5. Stream A is still fed to the heat exchanger at a temperature of from about 70° to about 115° F., (about 21° to about 46° C.) preferably 110°±5° F., (43°±3° C.) but Stream B will exit from the heat exchanger at a temperature of from about 150° to about 170° F., (about 66° to about 77° C.) preferably 160°±5° F. (71°±3° C.). Stream C exits from th bottom of the stripping column at a temperature of from about 150° to about 180° F., (about 66° to about 82° C.) and preferably 170°±5° F. (77°±3° C.). Prior to feed into the heat exchanger, Stream C is broken into two smaller feed streams, Streams C' to the heat exchanger, and Stream C" directly to the collecting tank. Stream D, the cooled stripped stream, exits from the heat exchanger at a temperature of from about 90° to about 130° F., (about 32° to about 54° C.) preferably 120°±5° F. (49°±3° C.). Stream D, however, is not fed to the collecting tank, as in the process of FIG. 4, but is recycled to the bottom of the stripping column. It will, of course, be clear that the flow rate of Stream C" must be greater than that of the raw PVC slurry feed, Stream A (or Stream B).

It was noted earlier that the slurry reaches a temperature of about 230° F. (110° C.) as it reaches the bottom of the stripping column. Since the slurry tends to collect as a pool at the bottom of the column, it tends to be adversely effected on terms of heat history. By recycling Stream D from the heat exchanger to the bottom of the stripping column, at a temperature of about 120° F., (49° C.) it serves to immediately reduce the temperature of the slurry collected in the pool at the bottom of the stripper to a temperature of about 190° F., (88° C.) well below the critical temperatures, of about 200° F., (93° C.) where adverse heat history problems are likely to be encountered. While mechanical mixing can be employed, we have found it advantageous to locate the inlet means for addition of the recycled Stream D into the stripping column at a point below the outlet means for Stream C (or at least below the level of the pool of PVC slurry collected at the bottom of the column), so that Stream D is added into the slurry collected in a pool at the bottom of the stripping column, thereby providing its own agitation to promote mixing and cooling.

EXAMPLE

An aqueous (30% solids) raw slurry of PVC (Sp.G 1.1) at a temperature of 110°±5° F. (43°±3° C.) was fed at an average rate of 77 gpm (Stream A of FIG. 5) from a blowdown tank to the cold inlet port (port 1a of FIG. 1) of a horizontal spiral heat exchanger (American Heat Reclaiming Corp.; Type 1-H; area 240 sq. ft., minimum spacing of channels=0.5 inches). The raw slurry exited from outlet port 1b at a temperature of 160°±5° F. (71°±3° C.) and was fed (Stream B of FIG. 5) to the top of a VCM stripping column.

Stripped slurry was removed from the bottom of the stripping column at an average rate of 130 gpm at a temperature of 195°±5° F. (49°±3° C.) and fed to a valve means where it was divided into two portions Stream C', which was fed to the heat exchanger, and Stream C", which was fed at an average rate of 84 gpm directly to a collection means, from which it was dried and finished by conventional procedures. Stream C' was fed at an average rate of 46 gpm to the hot inlet port 2a of the heat exchanger. The cooled stripped slurry exited from the heat exchanger through outlet port 2b at an average rate of 46 gpm and a temperature of 120°±5° F. and was recycled (Stream D) to the bottom of the stripping column where it was allowed to mix with the stripped slurry pooled at the bottom of the column, cooling it from a previous average temperature of about 230° F. (110° C.) (as it left the bottom tray in the stripping column) to a temperature of about 195° (91° C.) as it collected in a pool at the bottom of the stripping column preparatory to withdrawal from the stripping column into Stream C.

It will, of course, be obvious that the foregoing example is presented by way of illustration and not by way of limitation, and that many changes can be made without departing from the spirit of the present invention. Thus, the flow rates of Stream A and B can vary from as low as 36 to as high as 100 gpm and that of Stream C can vary from 70 to 140 gpm. This represents the preferred range of feed rates, and even greater variations of feed rates can, of course, be achieved, though a smaller (or larger) surface area heat exchanger may be required. Similarly, heat exchangers having channel width as narrow as 0.1 inches can be employed.

Also, while the present discussion speaks of feeding Stream B to the "top" of the stripping column, in many cases the level of residual VCM is relatively low, and Stream B may be fed into the stripping column at a point only halfway to the top, or even less. Similarly, while we discuss withdrawing Stream C from the bottom of the column (and/or recycling Stream D to the bottom of the column), this really denotes the lower area of the column, which may indeed be somewhat above the actual bottom.

Where desired, additional cooling of Stream C can be achieved, either using conventional PVC slurry cooling procedures, or using an additional spiral heat exchanger and a supplementary cooling medium. This would, of course, more likely be useful with the embodiment illustrated by FIG. 4 than that illustrated by FIG. 5. Also, while the foregoing discussion has referred to PVC suspension polymerization, similar procedures might be employed in conjunction with emulsion polymerization of PVC, though special control might be required in view of the greater heat sensitivity of PVC paste resin, and the potential mechanical instability of the latex itself.

In view of the foregoing, it will be clear that a wide variety of changes can be made without departing from the scope of the invention herein disclosed, and it is our intention to be limited by the appended claims.

What is claimed is:

1. In the process of suspension polymerization of polyvinyl chloride homopolymers and copolymers of vinyl chloride and other comonomers wherein at least 75 percent of the monomer units are vinyl chloride, said process including a step wherein a raw polyvinyl chloride slurry is fed from a raw slurry holding means to a vinyl chloride monomer stripping column in which it flows downward over a series of trays while subjected to a combination of steam and pressure/vacuum conditions; the improvement which comprises first passing said raw polyvinyl chloride resin slurry at a temperature of from about 70° to about 115° F. to the cold inlet port of a spiral heat exchanger which has a minimum channel width of about 0.1 inch, then passing the raw polyvinyl chloride slurry outflow from the heat exchanger to said stripping column at a temperature of from about 150° to about 170° F.; removing an outflow stream of stripped polyvinyl chloride slurry from said stripping column at a temperature of from about 150° to about 200° F., then splitting said stripped outflow stream into two substreams, a first substream which is passed to the hot feed inlet port of said heat exchanger and a second substream which is fed directly to means where it is dried and finished, the flow rate of said second substream exceeding the flow rate of raw polyvinyl chloride suspension resin slurry into said stripping column; and wherein the outflow of the stripped polyvinyl chloride suspension resin slurry exits from said heat exchanger at a temperature of from about 90° to about 130° F. and is recycled to the bottom of said stripping column.

2. The process according to claim 1 wherein said recycled stream from said heat exchanger to the bottom of said stripping column is passed into said stripping column at a point below the level of liquid.

3. The process according to claim 2 wherein said heat exchanger has a minimum channel width of about 0.5 inches.

* * * * *